(12) United States Patent
Murray et al.

(10) Patent No.: US 6,367,161 B1
(45) Date of Patent: Apr. 9, 2002

(54) RULE ASSEMBLY WITH INCREASED STANDOUT

(75) Inventors: John C. Murray, Caton; Michael D. Mariano, Kensington, both of CT (US)

(73) Assignee: The Stanley Works, New Britain, CT (US)

( * ) Notice: Subject to any disclaimer, the term of this patent is extended or adjusted under 35 U.S.C. 154(b) by 0 days.

(21) Appl. No.: 09/366,562

(22) Filed: Aug. 4, 1999

Related U.S. Application Data

(60) Provisional application No. 60/096,687, filed on Aug. 14, 1998.

(51) Int. Cl.$^7$ ................................................ G01B 3/10
(52) U.S. Cl. ............................... 33/757; 33/755; 33/771
(58) Field of Search ........................... 33/757, 755, 769, 33/771, 761

(56) References Cited

U.S. PATENT DOCUMENTS

| | | | |
|---|---|---|---|
| 1,730,199 A | * 10/1929 | Farrand | 242/396.6 |
| 2,307,395 A | * 1/1943 | Dinhofer | 33/757 |
| 3,899,001 A | 8/1975 | Orme | |
| 4,275,503 A | * 6/1981 | Bergkvist | 33/757 |
| 4,352,244 A | * 10/1982 | Tomuro | 33/757 |
| 4,429,462 A | 2/1984 | Rutty et al. | |
| 4,801,374 A | 1/1989 | Harold | |
| 5,063,868 A | * 11/1991 | Peloquin | 33/757 |

FOREIGN PATENT DOCUMENTS

| | | | | |
|---|---|---|---|---|
| DE | 2946-706 | * | 5/1981 | 33/757 |
| FR | 1193809 | * | 11/1959 | 33/755 |

* cited by examiner

*Primary Examiner*—Andrew H. Hirshfeld
(74) *Attorney, Agent, or Firm*—Pillsbury Winthrop LLP

(57) ABSTRACT

A coilable rule assembly having an increased standout in which an intermediate blade portion, which includes the normal breakpoint for a rule blade of the width, thickness, cross-sectional configuration, and material of the free end blade portion thereof and at least the increase in the standout contemplated, has a modified cross-sectional configuration with respect to the free end blade portion which is constructed and arranged to provide a greater resistance to bending into a flattened condition in the direction of the convex side thereof than the free end blade portion so as to increase the standout of the rule blade while allowing progressive movement into a flattened condition in the direction of the concave side during winding of the rule blade into the coiled state. The intermediate blade portion is formed with a rib structure extending longitudinally therein when in an uncoiled state which resists bending in the concave direction. The intermediate blade portion including the rib structure when in its flattened coiled configuration having a cross-section which lies within an elongated rectangle having a thickness slightly greater than the uniform thickness of the rule blade by virtue of the rib structure therein.

9 Claims, 8 Drawing Sheets

RULE ASSEMBLY WITH INCREASED STANDOUT

This application claims the benefit of U.S. Provisional Application No. 60/096,687, filed Aug. 14, 1998.

The present invention relates to coilable rule assemblies and more particularly to such rule assemblies employing coilable metal blades with greater standout length when unsupported as extended from the housing.

BACKGROUND OF THE INVENTION

The present subject matter constitutes an improvement of the subject matter disclosed in commonly owned U.S. Pat. No. 4,429,462, the disclosure of which is hereby incorporated into the present specification.

As stated in the '462 patent, coilable metal rules are widely used and frequently employ a concavo-convex cross-section or other cross-sectional configuration which will stiffen the blade so that the user may single-handedly bridge a distance with the blade tip extended in a straight line. This enables the user to bridge doorways, shaftways, excavations and the like with the unsupported blade. It is known that the degree of curvature or cross-section will influence and substantially determine the standout length (the length of the blade which can be extended unsupported without collapsing at the support point) or breakpoint (the point at which the unsupported rule will collapse) for a rule of any particular width, thickness and metal characteristics.

Such blades are generally used in power returnable coilable rules that include a coiled spring which has the effect of retracting the extended blade into the rule housing or housing wherein it coils about the reel in its retracted position. It will be appreciated that concavo-convex cross-section of the blade is flattened as it is coiled within the rule housing, whether by manual action or by the retracting effect of such a power return spring. The stiffer the blade, the more spring power required to effect such flattening of the blade upon retraction.

As is also well known, blades employing such a concavo-convex cross-section generally must be heat treated to achieve the desired flexural characteristics to withstand the repeated flattening operation that occurs in the coiling of the blade within the rule housing. It has been necessary to balance the advantages to be gained by increasing the depth of curvature of the blade for increased length of blade standout with the power requirements for the spring to effect its retraction and also with the life characteristics resulting from repeated deflection into the flattened condition when the blade is coiled.

Moreover, because the extended blade will assume the concavo-convex cross-section, the indicia which are imprinted thereon become more difficult to read when the arcuate cross-section becomes steeper. Lastly, when there is a very high cross curve or deep cross-section, there is a stress point at the point where the blade does buckle when fully extended, which, over repeated usage, may cause a stress fracture.

Because of the necessity for balancing these various factors, the range of average standout length for commercially available widths of concavo-convex blades is set forth in the following table:

| BLADE WIDTH, INCHES | STANDOUT LENGTH, INCHES |
| --- | --- |
| ¼ | 12–16 |
| ½ | 35–43 |
| ¾ | 55–73 |
| 1 | 86–97 |

The manner of achieving a greater standout in the '462 patent is to provide an intermediate portion of the blade having an extent along the length of the blade which includes the normal breakpoint for the blade and at least the increase in the standout contemplated which has a sharper arcuate extent than the remainder of the blade. The configuration of the intermediate portion is limited by the following statement found in the '462 patent specification:

Various cross-sections have been used for the concavo-convex blade construction. Generally, the cross-section is a segment of a circular arc or a segment of a circular arc with straight segments at its ends (e.g., rectilinear portions which are tangential to the center arcuate segment). In this manner the concavo-convex cross-section will not have any sharp bends which would produce points where the blade will be overstressed during the repeated flattening operation, and the amount of force required to flatten the curve is more readily available from economically utilizable power return springs.

The practical effect of this limitation is to render the additional standout which can be practically achieved to an amount which may not justify the added costs involved to change the configuration of the intermediate portion.

The present application is based upon the proposition that providing the intermediate portion with a configuration beyond the limits of the '462 patent intermediate portion configuration can have a practical material effect in extending the incremental standout without having a material effect on the size of the wrapped rule blade coil or the strength of the spring required to wrap the rule blade coil.

BRIEF DESCRIPTION OF THE INVENTION

Accordingly, it is an object of the present invention to provide a coilable rule assembly having an increased standout comprising a housing defining a chamber having an outlet, an elongated rule blade, and a controllable spring biased reel assembly mounted within the chamber having one end of the rule blade connected thereto. The controllable spring biased reel assembly is constructed and arranged to wind the rule blade into a coiled state within the chamber and to allow the rule blade to be extended outwardly of the chamber outlet into an uncoiled state. The rule blade is formed of a strip of resiliently deflectable metal having a uniform width and thickness such that when extended into the uncoiled state the rule blade assumes a generally concavo-convex cross-sectional configuration with the concave side having indicia thereon and when wound in the direction of its concave side into the coiled state the rule blade assumes a flattened coil configuration. The rule blade has an end blade portion connected to the controllable spring biased reel assembly, a free end blade portion and an intermediate blade portion between the end blade portions.

The free end portion is constructed and arranged to stand out by itself from the housing with the concave side facing generally upwardly without bending into a flattened condition in the direction of the convex side thereof along a breakpoint while allowing progressive movement into a flattened condition in the direction of the concave side of the rule blade during winding thereof into the coiled state. The intermediate blade portion has an extent which includes the normal breakpoint for a rule blade of the width, thickness, cross-sectional configuration, and material of the free end blade portion thereof and at least the increase in the standout contemplated. The intermediate blade portion has a modified cross-sectional configuration with respect to the free end blade portion which is constructed and arranged to provide a greater resistance to bending into a flattened condition in the direction of the convex side of the rule blade than the free end blade portion so as to increase the standout of the rule blade while allowing progressive movement into a flattened condition in the direction of the concave side of the rule blade during winding thereof into the coiled state. The intermediate blade portion is formed with rib structure extending longitudinally therein when in an uncoiled state which resists bending in the direction of the concave side of the rule blade. The intermediate blade portion including the rib structure when in its flattened coiled configuration has a cross-section which lies within an elongated rectangle having a thickness slightly greater than the uniform thickness of the rule blade by virtue of the rib structure therein.

Preferably, the rib structure is in the form of a pair of generally parallel elongated shallow ribs equally positioned on opposite sides of the center line of the rule blade, although the broadest aspects of the invention contemplates a single centrally located shallow rib or more than two shallow ribs. Preferably, the ribs open in the direction of the concave side of the rule blade although it is also contemplated that they open in the direction of the convex side of the rule blade.

Preferably, the ribs are formed by the juncture between a central arcuate cross-sectional segment and outer cross-sectional end segments which are preferably straight although curved end segments are contemplated.

DETAILED DESCRIPTION OF THE PREFERRED EMBODIMENTS OF THE INVENTION

Figure 1:
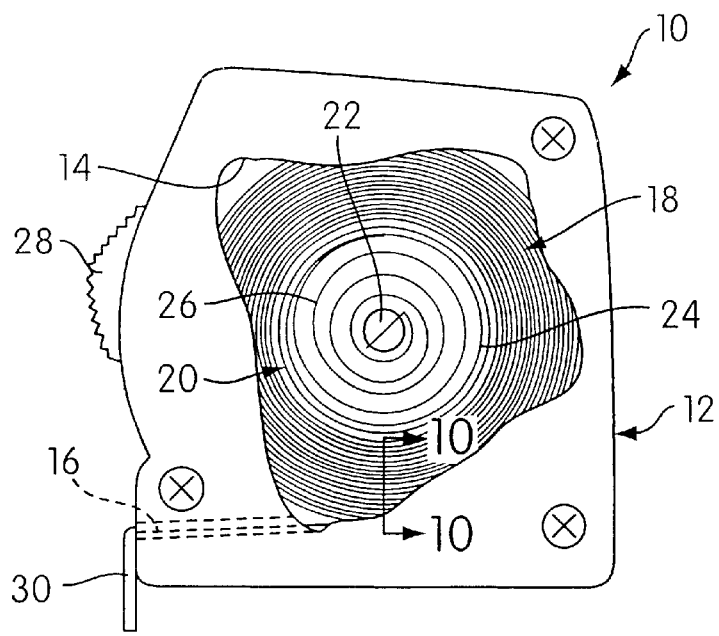
FIG. 1 is a side elevational view of a coilable rule assembly embodying the principles of the present invention with certain parts broken away for purposes of clear illustration.
Figure 2:
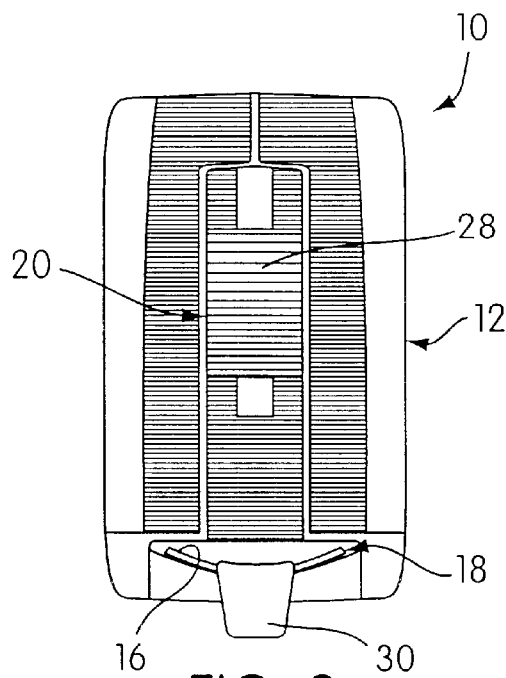
FIG. 2 is a front elevational view of the coilable rule assembly shown in FIG. 1.

Referring now more particularly to FIG. 1, there is shown therein a coilable rule assembly, generally indicated at 10, which embodies the principles of the present invention. In accordance with conventional practice, the coilable rule assembly 10 includes, in general, a housing, generally indicated at 12, defining a chamber 14 having an outlet 16, an elongated rule blade, generally indicated at 18, constructed in accordance with the principles of the present invention, and a controllable spring-biased reel assembly, generally indicated at 20, mounted within the chamber 14 and having one end of the rule blade 18 connected thereto.

The controllable spring-biased reel assembly 20 may embody any known construction. A preferred embodiment is disclosed in U.S. Pat. No. 3,214,836, dated Nov. 2, 1996, the disclosure of which is hereby incorporated by reference into the present specification. Briefly, it will be noted that the controllable spring-biased reel assembly 20 includes a central member 22 which is fixed to the housing 12, a reel hub 24 and a coil spring 26 between the hub 24 and the central member 22 to which an attached end of the elongated rule blade 18 is secured. The controllable spring-biased reel assembly 20 is constructed and arranged to wind the rule blade 18 into a coiled state within the chamber 14 and to allow the rule blade 18 to be extended outwardly of the chamber outlet 16 into an uncoiled state. The controllable spring-biased reel assembly 20 includes a manually movable stop mechanism 28 which enables the operator to control the spring-biased reel assembly 20 so as to effect the wind-up when desired and to retain the rule blade 18 into an uncoiled position by a braking action, when desired.

The opposite free end of the rule blade 18 has a conventional hook 30 mounted thereon in conventional fashion so as to accommodate the thickness of the hook during inside and outside measurements as is well known.

Figure 3:
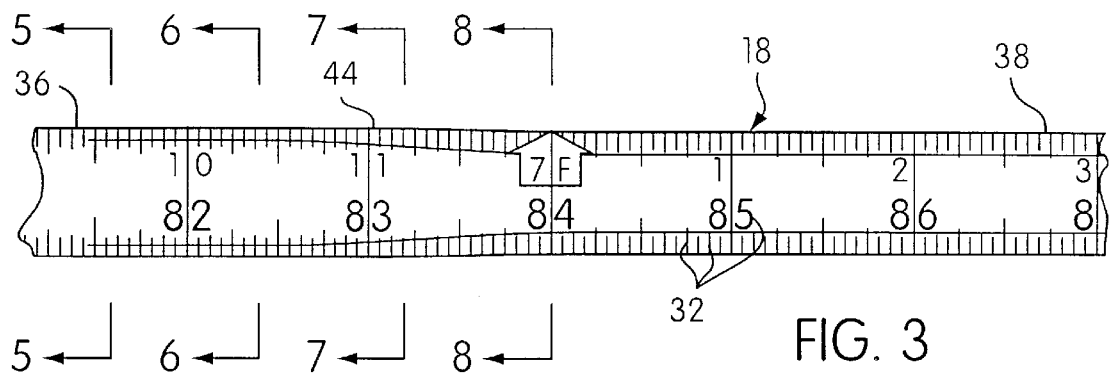
FIG. 3 is a fragmentary top plan view of the rule blade in the area of the juncture between the free end blade portion and the intermediate blade portion.
Figure 4:
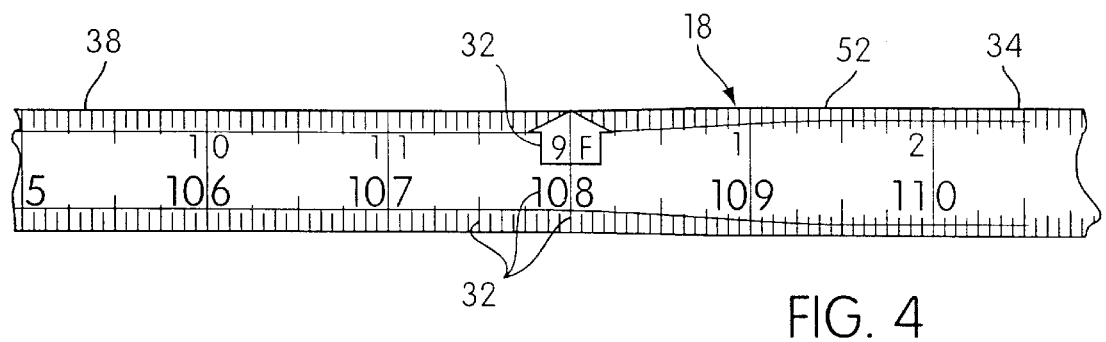
FIG. 4 is a view similar to FIG. 3 showing the rule blade in the area at the juncture between the intermediate blade portion and the attached end blade portion.

The rule blade 18 is formed of a strip of resiliently deflectable metal having a uniform width and thickness such that when extended into the uncoiled state, the rule blade 18 assumes a generally concavo-convex cross-sectional configuration and, when wound in the direction of its concave side into the coiled state, the rule blade 18 assumes a flattened coiled configuration. As shown in FIGS. 3 and 4, the concave side of the rule blade 18 is provided with suitable indicia 32 which, as shown, is indicative of inches although it will be understood that other indicia, such as metric measurements and the like, can be provided.

In accordance with the principles of the present invention, the elongated rule blade 18 is formed with a relatively long attached end blade portion 34 which is attached to the controllable spring-biased reel assembly 20, a relatively short free end blade portion 36 which embodies the hook 30, and an intermediate blade portion 38 between the end blade portions 34 and 36 which is constructed in accordance with the principles of the present invention.

Figure 5:
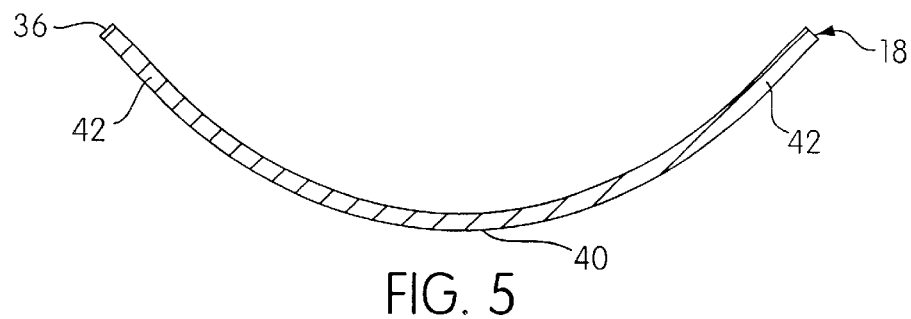
FIG. 5 is an enlarged fragmentary sectional view taken along the line 5—5 of FIG. 3.

As best shown in FIGS. 3 and 5, a preferred cross-sectional configuration of the free end blade portion 36 of the rule blade 18 in its uncoiled state presents a central concavo-convex cross-sectional segment 40 which is arcuate about a center point and two relatively short end cross-sectional segments 42 which, as shown in FIG. 5, are straight and extend tangentially from the central arcuate cross-sectional segment 40. It will be understood that the cross-section may, in accordance with usual practice, be arcuate throughout from end to end. In the preferred embodiment shown, the attached end blade portion 34 has the same configuration as the free end portion.

Figure 6:
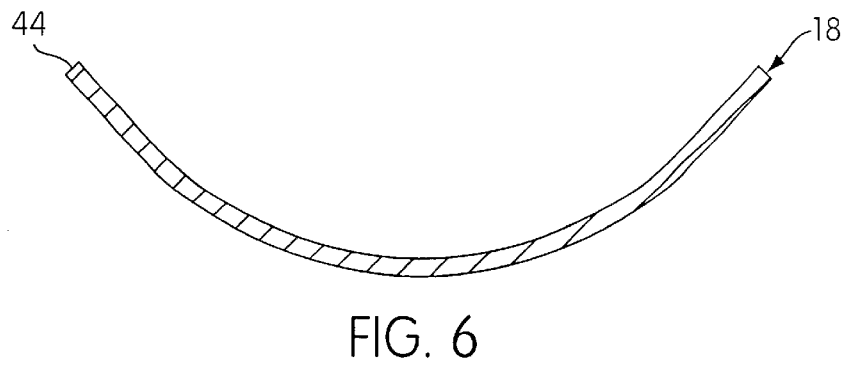
FIG. 6 is an enlarged sectional view taken along the line 6—6 of FIG. 3.
Figure 7:
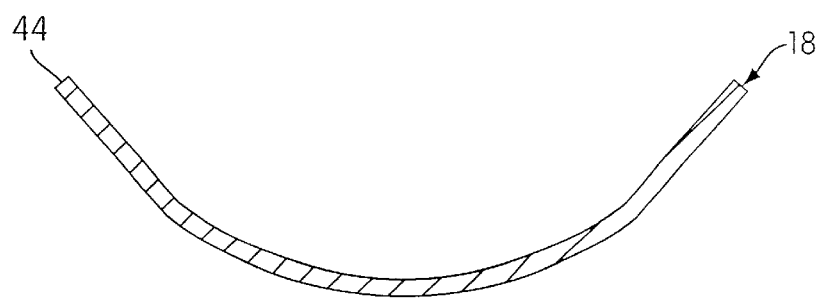
FIG. 7 is an enlarged sectional view taken along the line 7—7 of FIG. 3.

Referring now more particularly to FIGS. 3, 6 and 7, it can be seen that there is included in the rule blade 18 a transitional section 44 between the free end blade portion 36 and the intermediate blade portion 38 which, as can be seen from FIGS. 6 and 7, provides a gradual change from the cross-sectional configuration of the free end blade portion 36 to the modified cross-sectional configuration of the intermediate blade portion 38.

Figure 8:
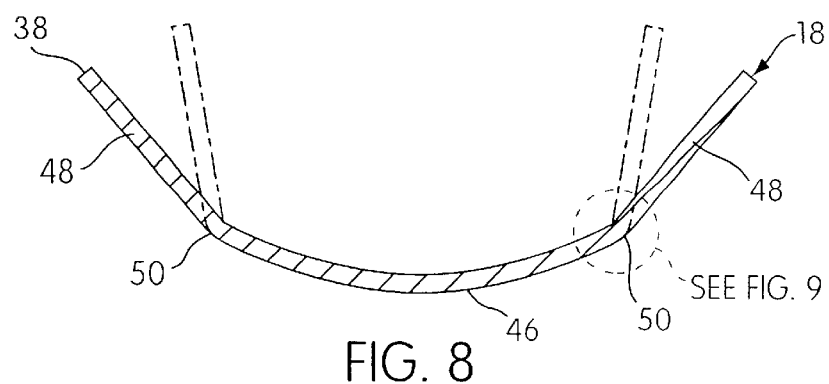
FIG. 8 is an enlarged sectional view taken along the line 8—8 of FIG. 3 and showing the shape of the intermediate blade portion of the rule blade in its uncoiled state in solid lines with its shape after the formation thereof and prior to the winding of the intermediate blade portion into a flattened coiled condition being shown in phantom lines.
Figure 9:
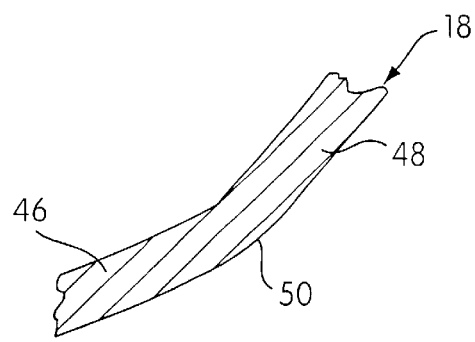
FIG. 9 is an enlarged fragmentary sectional view of the portion of the cross-sectional configuration shown in FIG. 8 within the circle 9.

Referring now more particularly to FIGS. 3 and 8, it can be seen that the modified cross-sectional configuration of the intermediate blade portion 38 includes a central arcuate cross-sectional segment 46 and two end cross-sectional segments 48 which, at their intersections with the central segment 46 form a pair of parallel ribs 50 disposed which extend equally on opposite sides of a center line of the intermediate blade portion 38. As shown, the preferred configuration of the intermediate blade portion 38 is for the central segment 46 to have the same arcuate curve (or same radius) as the arcuate segments 40 of the end blade portions 34 and 36 and for the end segments 48 to be straight.

The intermediate blade portion 38 is formed by a stamping operation in the manner described in the aforesaid '462 patent after the entire rule blade 18 has been roll formed into the cross-sectional configuration of the two end blade portions 34 and 36. As shown in phantom in FIG. 8, the cross-sectional configuration of the intermediate blade portion 38 as initially formed by the stamping operation moves the end cross-sectional segments 48 to a sharper angle with respect to the central segment is assumed in operation in the uncoiled state. It will be understood from FIG. 8 that, once the intermediate blade portion 38 of the rule blade 18 has been coiled into the flattened coil formation shown in FIG. 10, the straight end cross-sectional segments 48 thereof will be deflected beyond the elastic limit of the blade material from the initially stamped phantom line position into a position shown in solid lines. It is the solid line position which is assumed during operation when the rule blade 18 is moved into its uncoiled state.

Referring now more particularly to FIG. 4, it can be seen that the rule blade 18 provides another transitional section 52 between the intermediate blade portion 38 and the attached end blade portion 34 and this transitional section 52 is a mirror image of the transitional section 44 between the free end blade portion 36 and the intermediate blade portion 38.

In the embodiment shown in FIGS. 3 and 4, the free end blade portion 34 is constructed and arranged to stand out by itself from the housing 12 with the concave side facing generally upwardly without bending into a flattened condition in the direction of the concave side thereof along a breakpoint while allowing a progressive movement into a flattened condition in the direction of the concave side of the rule blade 18 during winding thereof into the coiled state. In the exemplary embodiment shown, the rule blade 18 has a uniform width of one inch and a thickness of approximately 0.005 inches. The radius of curvature of the central arcuate cross-sectional segment 40 is approximately 0.537 inches and the flat tangential end segments 42 have an extent of approximately 0.125 inches. The rule blade 18 is made of steel and has a length of 30 feet. In the embodiment shown, the free end blade portion 36 has a standout capability of approximately seven feet and the intermediate blade portion 38 has an extent which includes the normal break point for a rule blade of the width, thickness, cross-sectional configuration and material of the free end portion and at least an amount which is equal to the increase in the standout which is contemplated. As shown, in FIGS. 3 and 4, the intermediate section extends from the seven-foot area to the nine-foot area. However, it will be understood that this extent in position within the overall length is exemplary only and can vary depending upon the width, thickness, cross-sectional configuration and material of the free end portion of the rule blade utilized.

Figure 10:
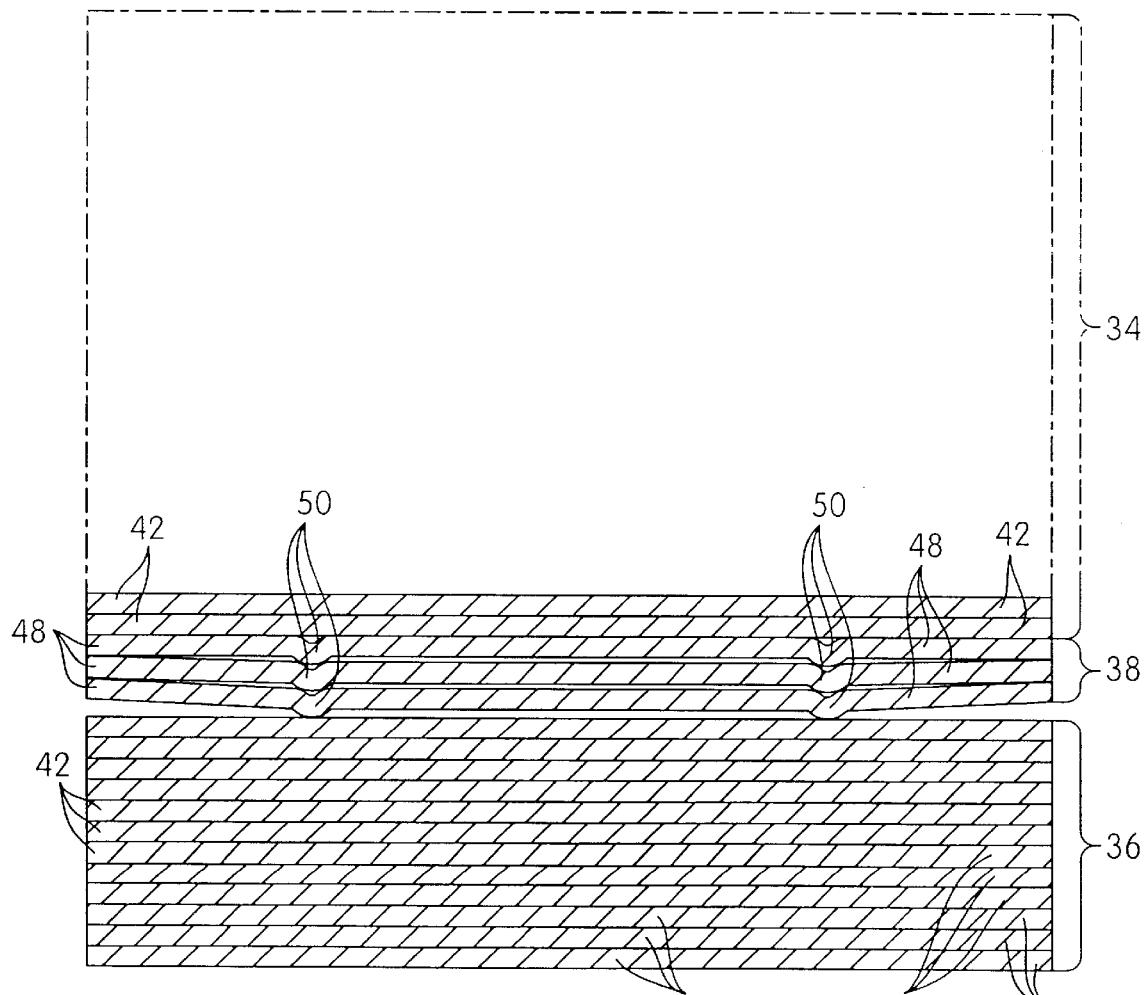
FIG. 10 is an enlarged fragmentary sectional view taken along the line 10—10 of FIG. 1.

Referring now more particularly to FIG. 10, it can be seen that, when the rule blade 18 is wound into its coiled state around the controllable spring-biased reel assembly 20 within the housing 12, the attached end blade portion 34 will form approximately 30 flat coils, each of which in cross-sectional configuration assumes a configuration within a rectangle which is equal to the width and thickness of the rule blade 18 itself. The intermediate blade portion 38 when wound forms three coils. However, the cross-sectional configuration of the intermediate blade portion 38 in the flattened condition is not contained within a rectangle which is equal to the width and thickness. Instead, the cross-section of the intermediate blade portion 38 is contained within a rectangle which is slightly greater in thickness than the uniform thickness of the rule blade by virtue of the rib structure 50 therein. Finally, it will be noted that, when the rule blade 18 is fully wound, the initial end blade portion 36 will form 12 flattened coils in the manner quite similar to the attached end blade portion 34. It can be seen from FIG. 10 that there is no significant increase in the radius of the final coil and, while there is an increase in the resistance to flattening in the direction of the convex side of the intermediate blade portion 38 which will increase its standout, there is only a slight increase in the resistance to flattening in the direction of the concave side so that additional spring effort to effect the total coil formation is not required. It will be understood that the configuration of the ribs 50 in FIG. 10 is exaggerated somewhat.

Figure 11:
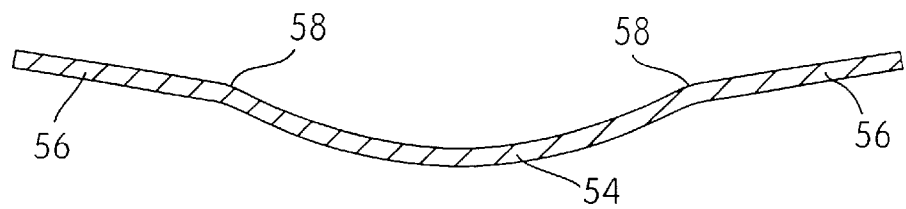
FIGS. 11, 13, 15, 17, 19, 21, 23 and 25 are views similar to FIG. 8 illustrating various modified cross-sectional configurations of the intermediate portion of the rule blade in accordance with the principles of the present invention.
Figure 12:
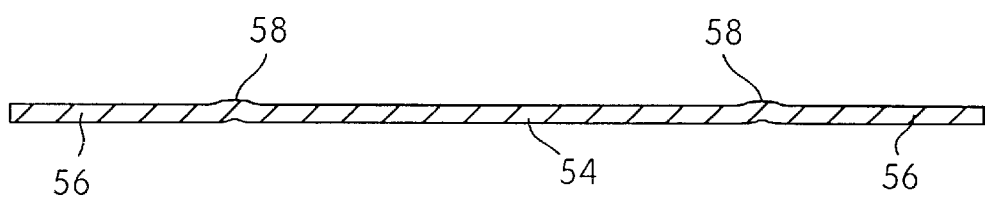
FIGS. 12, 14, 16, 18, 20, 22, 24 and 26 are cross-sectional view of the embodiments shown in FIGS. 11, 13, 15, 17, 19, 21, 23 and 25, respectively showing the configuration of the various modified cross-sectional configurations when in a flattened coiled condition.

The provision of a pair of ribs 50 such as illustrated in FIG. 8 constitutes a preferred construction of the present invention although the dual rib structure is not the only rib structure contemplated in accordance with the broader principles of the present invention. Various modified configurations are illustrated in FIGS. 11–26 and in each of these various configurations it will be understood that they are formed initially in the same manner as the intermediate portion of FIG. 8 and that the illustration in the subsequent figures of the drawings shows both the final assumed cross-section configuration when in the uncoiled state and the assumed configuration when in the coiled state. The modification shown in FIGS. 11 and 12 is most like that shown in FIG. 8 in that this configuration includes a similarly shaped central arcuate cross-sectional segment 54 and two flat end cross-sectional segments 56 which define two ribs 58 at the juncture with the central segment 54. In the embodiment shown in FIG. 11, however, the flat end segments 56 are bent in the direction of the convex side of the rule blade 18 rather than in the direction of the concave side of the rule blade 18 as in FIG. 8.

Figure 13:
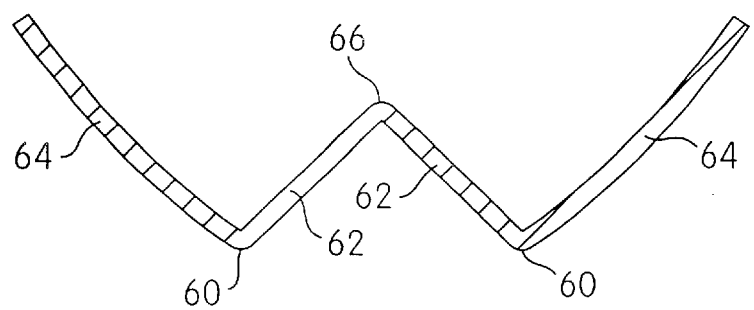
Figure 14:
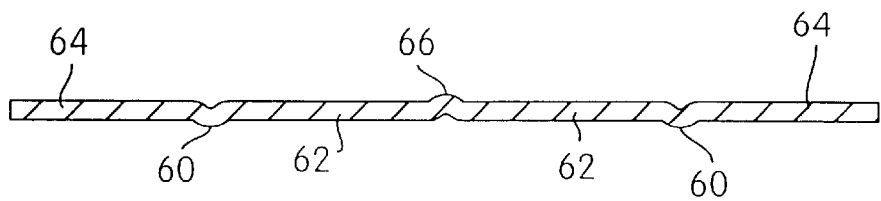

FIGS. 13 and 14 illustrate a modified cross-sectional configuration of the intermediate portion 38 which provides two ribs 60 similar to the ribs of FIG. 8 between a central segment 62 and two end segments 64. However, in the FIGS. 13 and 14 embodiment, the central segment is not a concavo-convex arcuate configuration as in FIGS. 8 and 11, but instead is formed in an essentially reverse angular configuration so as to provide an additional central rib 66.

Figure 15:
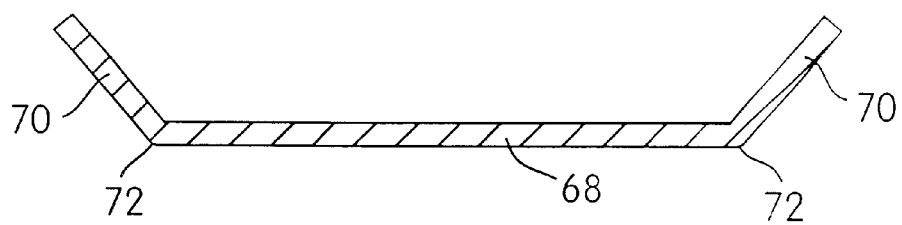
Figure 16:
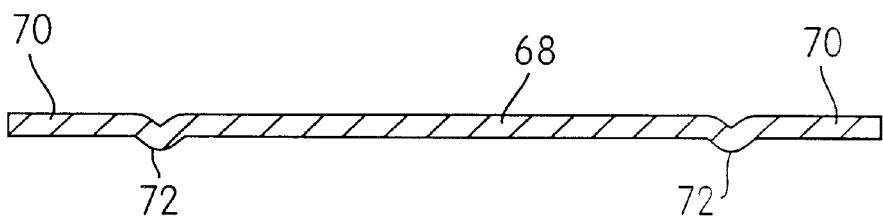

The embodiment shown in FIGS. 15 and 16 is essentially like that shown in FIG. 8 except that a flat central segment 68 is provided between central flat end segments 70 to form ribs 72.

Figure 17:
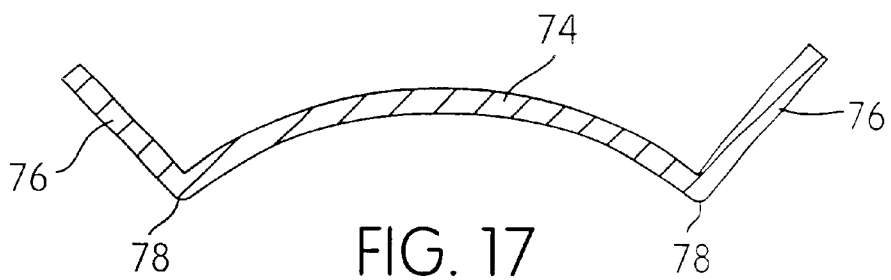
Figure 18:
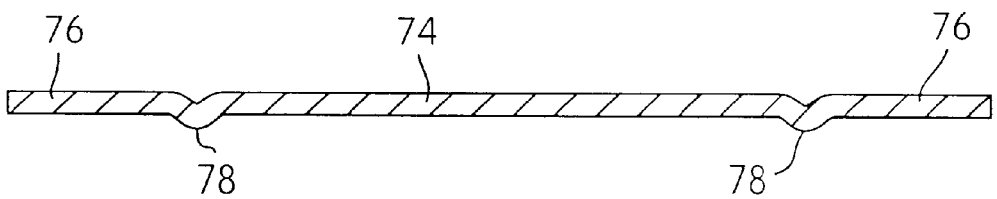

FIGS. 17 and 18 illustrate a modification which is also similar to FIG. 8 except that there is provided a reverse concavo-convex arcuately shaped central segment 74 between flat end segments 76 to form ribs 78.

Figure 19:
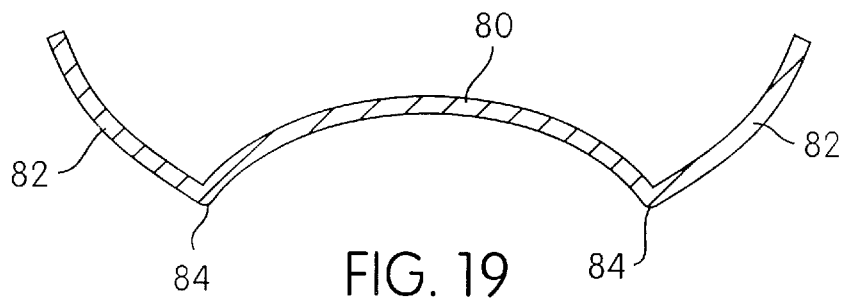
Figure 20:
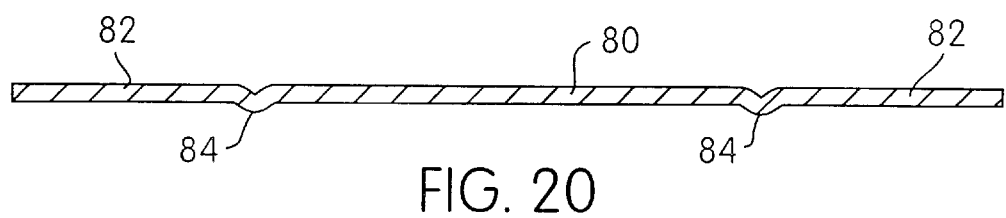

FIGS. 19 and 20 illustrate a modification similar to FIG. 17 having a central segment 80 of similar shape with end segments 82 forming similar ribs 84. The end segments 82 are themselves arcuate rather than straight, the arcuate extent being concavo-convex in a reverse manner from the central arcuate segment 80.

Figure 21:
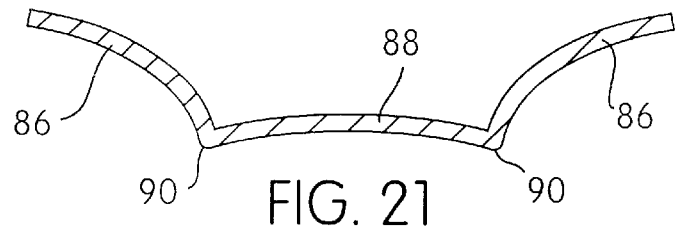
Figure 22:
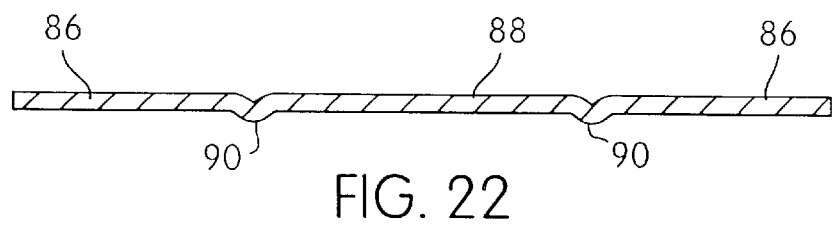

FIGS. 21 and 22 show a similar configuration to FIGS. 19 and 20 except that there are provided end segments 86 having a reverse arcuate configuration on opposite sides of a similar central segment 88 forming ribs 90.

Figure 23:
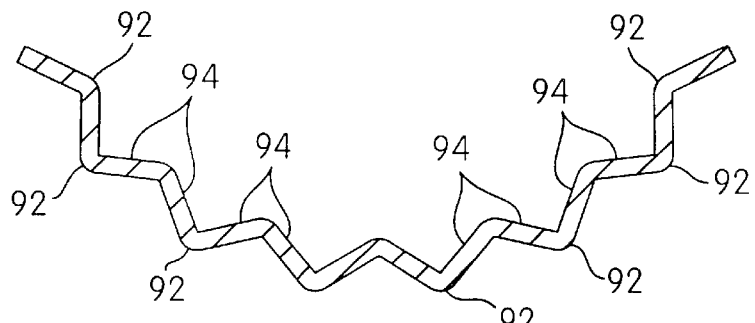
Figure 24:
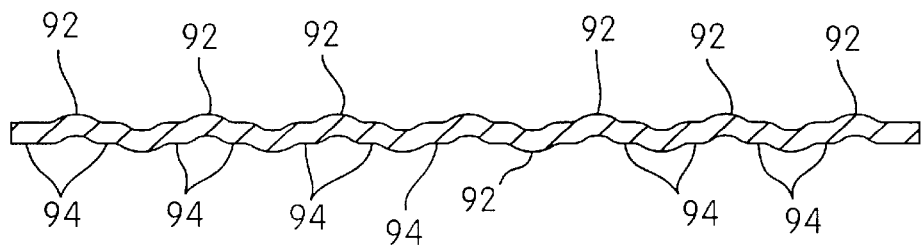

FIGS. 23 and 24 illustrate a multiple rib configuration in which a series of ribs 92 are defined by essentially straight segments 94 with the ribs opening alternately toward the concave side and then the convex side of the rule blade 18.

Figure 25:
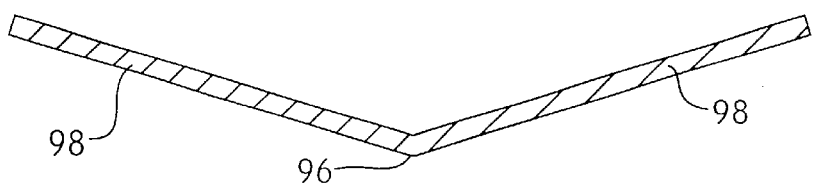
Figure 26:
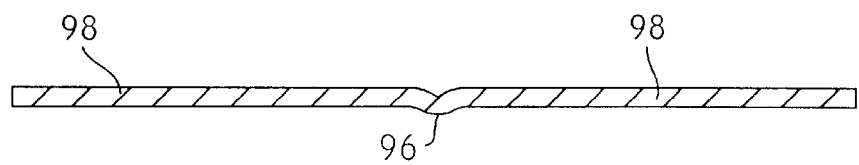

FIGS. 25 and 26 illustrate a single rib configuration in which the cross-section in essentially a wide V-configuration with a single rib 96 formed centrally therein on opposite sides of two flat segments 98.

What is claimed is:

1. A coilable rule assembly having an increased standout comprising a housing defining a chamber having an outlet, an elongated rule blade, a controllable spring biased reel assembly mounted within said chamber having one end of said rule blade connected thereto, said controllable spring biased reel assembly being constructed and arranged to wind said rule blade into a coiled state within said chamber and to allow said rule blade to be extended outwardly of said chamber outlet into an uncoiled state, said rule blade being formed of a strip of resiliently deflectable metal having a uniform width and thickness such that when extended into said uncoiled state said rule blade assumes a generally concavo-convex cross-sectional configuration with the concave side having indicia thereon and when wound in the direction of its concave side into said coiled condition said rule blade assumes a flattened single-ply coil configuration, said rule blade having an end blade portion connected to said controllable spring biased reel assembly, a free end blade portion and an intermediate blade portion between said end blade portions, said free end blade portion being constructed and arranged to stand out by itself from said housing with the concave side facing generally upwardly without bending into a flattened condition in the direction of the convex side thereof while allowing progressive movement into a flattened condition in the direction of the concave side of said rule blade during winding thereof into the coiled state, said intermediate blade portion including the normal breakpoint for a rule blade of the width, thickness, cross-sectional configuration, and material of the free end blade portion thereof and at least the increase in the standout contemplated, said intermediate blade portion having a modified cross-sectional configuration with respect to said free end blade portion which is constructed and arranged to provide a greater resistance to bending into a flattened condition in the direction of the convex side thereof than said free end blade portion so as to increase the standout of said rule blade while allowing progressive movement into a flattened condition during winding of the rule blade into the coiled state, said intermediate blade portion is formed with rib structure extending longitudinally therein when in an uncoiled state which resists bending in the concave direction, said intermediate blade portion including the rib structure when in its flattened coiled configuration having a cross-section which lies within an elongated rectangle having a thickness slightly greater than the uniform thickness of the rule blade by virtue of the rib structure therein, wherein said rib structure is in the form of a pair of generally parallel elongated shallow ribs equally positioned on opposite sides of the centerline of said rule blade, wherein said ribs are formed by a juncture between a central cross-sectional segment and a pair of spaced outer cross-sectional segments of said rule blade, and wherein the central cross section segment is arcuate and opens in the direction of the concave side of the rule blade.

2. A coilable rule assembly according to claim 1, wherein the outer cross-sectional segments are flat.

3. A coilable rule assembly according to claim 2 wherein said ribs open in the direction of the concave side of the rule blade.

4. A coilable rule assembly according to claim 2, wherein said ribs open in the direction of the convex side of the rule blade and the flat outer cross-sectional segments extend in the direction of the convex side of the rule blade.

5. A coilable rule assembly having an increased standout comprising a housing defining a chamber having an outlet, an elongated rule blade, a controllable spring biased reel assembly mounted within said chamber having one end of said rule blade connected thereto, said controllable spring biased reel assembly being constructed and arranged to wind said rule blade into a coiled state within said chamber and to allow said rule blade to be extended outwardly of said chamber outlet into an uncoiled state, said rule blade being formed of a strip of resiliently deflectable metal having a uniform width and thickness such that when extended into said uncoiled state said rule blade assumes a generally concavo-convex cross-sectional configuration with the concave side having indicia thereon and when wound in the direction of its concave side into said coiled condition said rule blade assumes a flattened single-ply coil configuration, said rule blade having an end blade portion connected to said controllable spring biased reel assembly, a free end blade portion and an intermediate blade portion between said end blade portions, said free end blade portion being constructed and arranged to stand out by itself from said housing with the concave side facing generally upwardly without bending into a flattened condition in the direction of the convex side thereof while allowing progressive movement into a flattened condition in the direction of the concave side of said rule blade during winding thereof into the coiled state, said intermediate blade portion including the normal breakpoint for a rule blade of the width, thickness, cross-sectional configuration, and material of the free end blade portion thereof and at least the increase in the standout contemplated, said intermediate blade portion having a modified cross-sectional configuration with respect to said free end blade portion which is constructed and arranged to provide a greater resistance to bending into a flattened condition in the direction of the convex side thereof than said free end blade portion so as to increase the standout of said rule blade while allowing progressive movement into a flattened condition during winding of the rule blade into the coiled state, said intermediate blade portion is formed with rib structure extending longitudinally therein when in an uncoiled state which resists bending in the concave direction, said intermediate blade portion including the rib structure when in its flattened coiled configuration having a cross-section which lies within an elongated rectangle having a thickness slightly greater than the uniform thickness of the rule blade by virtue of the rib structure therein, wherein said rib structure is in the form of a pair of generally parallel elongated shallow ribs equally positioned on opposite sides of the centerline of said rule blade, wherein said ribs are formed by a juncture between a central cross-sectional segment and a pair of spaced outer cross-sectional segments of said rule blade, and wherein the central cross-sectional segment is arcuate and opens in the direction of the convex side of the rule blade.

6. A coilable rule assembly having an increased standout comprising a housing defining a chamber having an outlet, an elongated rule blade, a controllable spring biased reel assembly mounted within said chamber having one end of said rule blade connected thereto, said controllable spring biased reel assembly being constructed and arranged to wind said rule blade into a coiled state within said chamber and to allow said rule blade to be extended outwardly of said chamber outlet into an uncoiled state, said rule blade being formed of a strip of resiliently deflectable metal having a uniform width and thickness such that when extended into said uncoiled state said rule blade assumes a generally concavo-convex cross-sectional configuration with the concave side having indicia thereon and when wound in the direction of its concave side into said coiled condition said rule blade assumes a flattened single-ply coil configuration, said rule blade having an end blade portion connected to said controllable spring biased reel assembly, a free end blade portion and an intermediate blade portion between said end blade portions, said free end blade portion being constructed and arranged to stand out by itself from said housing with the concave side facing generally upwardly without bending into a flattened condition in the direction of the convex side thereof while allowing progressive movement into a flattened condition in the direction of the concave side of said rule blade during winding thereof into the coiled state, said intermediate blade portion including the normal breakpoint for a rule blade of the width, thickness, cross-sectional configuration, and material of the free end blade portion thereof and at least the increase in the standout contemplated, said intermediate blade portion having a modified cross-sectional configuration with respect to said free end blade portion which is constructed and arranged to provide a greater resistance to bending into a flattened condition in the direction of the convex side thereof than said free end blade portion so as to increase the standout of said rule blade while allowing progressive movement into a flattened condition during winding of the rule blade into the coiled state, said intermediate blade portion is formed with rib structure extending longitudinally therein when in an uncoiled state which resists bending in the concave direction, said intermediate blade portion including the rib structure when in its flattened coiled configuration having a cross-section which lies within an elongated rectangle having a thickness slightly greater than the uniform thickness of the rule blade by virtue of the rib structure therein, wherein said rib structure is in the form of a pair of generally parallel elongated shallow ribs equally positioned on opposite sides of the centerline of said rule blade, wherein said ribs are formed by a juncture between a central cross-sectional segment and a pair of spaced outer cross-sectional segments of said rule blade, and wherein the outer cross-sectional segments are arcuate and open in the direction of the concave side of the rule blade.

7. A coilable rule assembly having an increased standout comprising a housing defining a chamber having an outlet, an elongated rule blade, a controllable spring biased reel assembly mounted within said chamber having one end of said rule blade connected thereto, said controllable spring biased reel assembly being constructed and arranged to wind said rule blade into a coiled state within said chamber and to allow said rule blade to be extended outwardly of said chamber outlet into an uncoiled state, said rule blade being formed of a strip of resiliently deflectable metal having a uniform width and thickness such that when extended into said uncoiled state said rule blade assumes a generally concavo-convex cross-sectional configuration with the concave side having indicia thereon and when wound in the direction of its concave side into said coiled condition said rule blade
assumes a flattened single-ply coil configuration, said rule blade having an end blade portion connected to
said controllable spring biased reel assembly, a free end
blade portion and an intermediate blade portion
between said end blade portions, said free end blade portion being constructed and
arranged to stand out by itself from said housing with
the concave side facing generally upwardly without
bending into a flattened condition in the direction of the
convex side thereof while allowing progressive movement into a flattened condition in the direction of the
concave side of said rule blade during winding thereof
into the coiled state, said intermediate blade portion including the normal
breakpoint for a rule blade of the width, thickness,
cross-sectional configuration, and material of the free
end blade portion thereof and at least the increase in the
standout contemplated, said intermediate blade portion having a modified cross-sectional configuration with respect to said free end
blade portion which is constructed and arranged to
provide a greater resistance to bending into a flattened
condition in the direction of the convex side thereof
than said free end blade portion so as to increase the
standout of said rule blade while allowing progressive
movement into a flattened condition during winding of
the rule blade into the coiled state, said intermediate blade portion is formed with rib structure extending longitudinally therein when in an
uncoiled state which resists bending in the concave
direction, said intermediate blade portion including the
rib structure when in its flattened coiled configuration
having a cross-section which lies within an elongated
rectangle having a thickness slightly greater than the
uniform thickness of the rule blade by virtue of the rib
structure therein, wherein said rib structure is in the form of a pair of
generally parallel elongated shallow ribs equally positioned on opposite sides of the centerline of said rule
blade, wherein said ribs are formed by a juncture between a
central cross-sectional segment and a pair of spaced
outer cross-sectional segments of said rule blade, and wherein the outer cross-sectional segments are arcuate
and open in the direction of the convex side of the rule
blade.

8. A coilable rule assembly having an increased standout comprising a housing defining a chamber having an outlet, an elongated rule blade, a controllable spring biased reel assembly mounted within
said chamber having one end of said rule blade connected thereto, said controllable spring biased reel assembly being constructed and arranged to wind said rule blade into a
coiled state within said chamber and to allow said rule
blade to be extended outwardly of said chamber outlet
into an uncoiled state, said rule blade being formed of a strip of resiliently
deflectable metal having a uniform width and thickness
such that when extended into said uncoiled state said
rule blade assumes a generally concavo-convex cross-sectional configuration with the concave side having
indicia thereon and when wound in the direction of its
concave side into said coiled condition said rule blade
assumes a flattened single-ply coil configuration, said rule blade having an end blade portion connected to
said controllable spring biased reel assembly, a free end
blade portion and an intermediate blade portion
between said end blade portions, said free end blade portion being constructed and
arranged to stand out by itself from said housing with
the concave side facing generally upwardly without
bending into a flattened condition in the direction of the
convex side thereof while allowing progressive movement into a flattened condition in the direction of the
concave side of said rule blade during winding thereof
into the coiled state, said intermediate blade portion including the normal
breakpoint for a rule blade of the width, thickness,
cross-sectional configuration, and material of the free
end blade portion thereof and at least the increase in the
standout contemplated, said intermediate blade portion having a modified cross-sectional configuration with respect to said free end
blade portion which is constructed and arranged to
provide a greater resistance to bending into a flattened
condition in the direction of the convex side thereof
than said free end blade portion so as to increase the
standout of said rule blade while allowing progressive
movement into a flattened condition during winding of
the rule blade into the coiled state, said intermediate blade portion is formed with rib structure extending longitudinally therein when in an
uncoiled state which resists bending in the concave
direction, said intermediate blade portion including the
rib structure when in its flattened coiled configuration
having a cross-section which lies within an elongated
rectangle having a thickness slightly greater than the
uniform thickness of the rule blade by virtue of the rib
structure therein, wherein said rib structure is in the form of a pair of
generally parallel elongated shallow ribs equally positioned on opposite sides of the centerline of said rule
blade, wherein said ribs are formed by a juncture between a
central cross-sectional segment and a pair of spaced
outer cross-sectional segments of said rule blade, and wherein said rib structure comprises a series of ribs which
open alternately in a direction of the concave side of the
rule blade and in a direction of the convex side of the
rule blade, wherein said series of ribs comprise thirteen.

9. A coilable rule assembly having an increased standout comprising a housing defining a chamber having an outlet, an elongated rule blade, a controllable spring biased reel assembly mounted within
said chamber having one end of said rule blade connected thereto, said controllable spring biased reel assembly being constructed and arranged to wind said rule blade into a
coiled state within said chamber and to allow said rule
blade to be extended outwardly of said chamber outlet
into an uncoiled state, said rule blade being formed of a strip of resiliently
deflectable metal having a uniform width and thickness
such that when extended into said uncoiled state said
rule blade assumes a generally concavo-convex cross-sectional configuration with the concave side having indicia thereon and when wound in the direction of its concave side into said coiled condition said rule blade assumes a flattened coil configuration, said rule blade having a end blade portion connected to said controllable spring biased reel assembly, a free end blade portion and an intermediate blade portion between said end blade portions, said free end blade portion being constructed and arranged to stand out by itself from said housing with the concave side facing generally upwardly without bending into a flattened condition in the direction of the convex side thereof while allowing progressive movement into a flattened condition in the direction of the concave side of said rule blade during winding thereof into the coiled state, said intermediate blade portion including the normal breakpoint for a rule blade of the width, thickness, cross-sectional configuration, and material of the free end blade portion thereof and at least the increase in the standout contemplated, said intermediate blade portion having a modified cross-sectional configuration with respect to said free end blade portion which is constructed and arranged to provide a greater resistance to bending into a flattened condition in the direction of the convex side thereof than said free end blade portion so as to increase the standout of said rule blade while allowing progressive movement into a flattened condition during winding of the rule blade into the coiled state, said intermediate blade portion having a central curved cross-sectional segment and a pair of spaced, flat outer cross-sectional segments which intersect the central curved cross-sectional segment to form a non-tangential included angle.

* * * * *